United States Patent

Araki et al.

[11] 3,949,106
[45] Apr. 6, 1976

[54] METHOD FOR PRODUCING ISOTROPIC PYROLISIS CARBON COATINGS

[75] Inventors: Tadashi Araki; Kiro Asano; Jun Yamada, all of Tokyo; Hisao Imaizumi, Urawa; Takao Awao, Tokyo, all of Japan

[73] Assignee: Toyo Boseki Kabushiki Kaisha, Osaka, Japan

[22] Filed: Feb. 19, 1974

[21] Appl. No.: 443,710

Related U.S. Application Data

[63] Continuation of Ser. No. 101,621, Dec. 28, 1970, abandoned.

[52] U.S. Cl. .............. 427/249; 264/29; 264/81; 427/212; 427/215; 427/255; 427/314; 427/316; 427/318; 427/405
[51] Int. Cl.² ........................................ C23C 11/10
[58] Field of Search ....... 117/46 CC, 46 CG, 106 R, 117/123 C; 264/29, 81; 423/458, 445; 427/249, 255, 314, 316, 318

[56] References Cited
UNITED STATES PATENTS

| | | | |
|---|---|---|---|
| 2,062,370 | 12/1936 | Miller | 117/46 CG |
| 2,196,172 | 4/1940 | Billings et al. | 117/46 CB |
| 2,282,235 | 5/1942 | Moberly | 117/46 CG |
| 2,778,743 | 1/1957 | Bowman | 117/46 CG |
| 2,780,539 | 2/1957 | Seiler | 117/46 CG |
| 3,164,487 | 1/1965 | Carley-Macauly | 117/46 CG |
| 3,247,008 | 4/1966 | Finicle | 117/46 CG |
| 3,429,486 | 2/1969 | Cope et al. | 264/29 |
| 3,475,211 | 10/1969 | Hasegaw et al. | 117/46 CG |
| 3,558,344 | 1/1971 | Peterson | 117/46 CC |
| 3,565,980 | 2/1971 | Otani | 264/29 |
| 3,791,847 | 2/1974 | Araki et al. | 117/46 CG |
| 3,851,048 | 11/1974 | Araki et al. | 117/46 CG |

OTHER PUBLICATIONS
Brown et al., Carbon, Vol. 4, pp. 193–199, (1966).
Walker et al., Carbon, Vol. 5, pp. 13–17, (1967).
Lahaye et al., Carbon, Vol. 6, pp. 419 and 420, (1968).
Edstrom et al., Carbon, Vol. 7, pp. 85–91, (1969).
Isaacs, Carbon, Vol. 7, pp. 531–534, (1969).

*Primary Examiner*—Harry J. Gwinnell
*Assistant Examiner*—Dennis C. Konopacki

[57] ABSTRACT

A material having a vapor pressure of at least 5 mm Hg at 490°C. and selected from aromatic and cycloaliphatic hydrocarbons and alkyl derivatives thereof, nitrogen-, oxygen- and sulfur-containing compounds having hetero rings and alkyl derivatives thereof, substituted compounds of these compounds, and substances containing these compounds is used as starting material. Such starting material is brought into contact in a vapor state, if necessary, diluted with an inert gas, with a substrate heated at a temperature of 600°–1500°C. thereby depositing the resulting isotropic pyrolytic carbon on the substrate.

6 Claims, 2 Drawing Figures

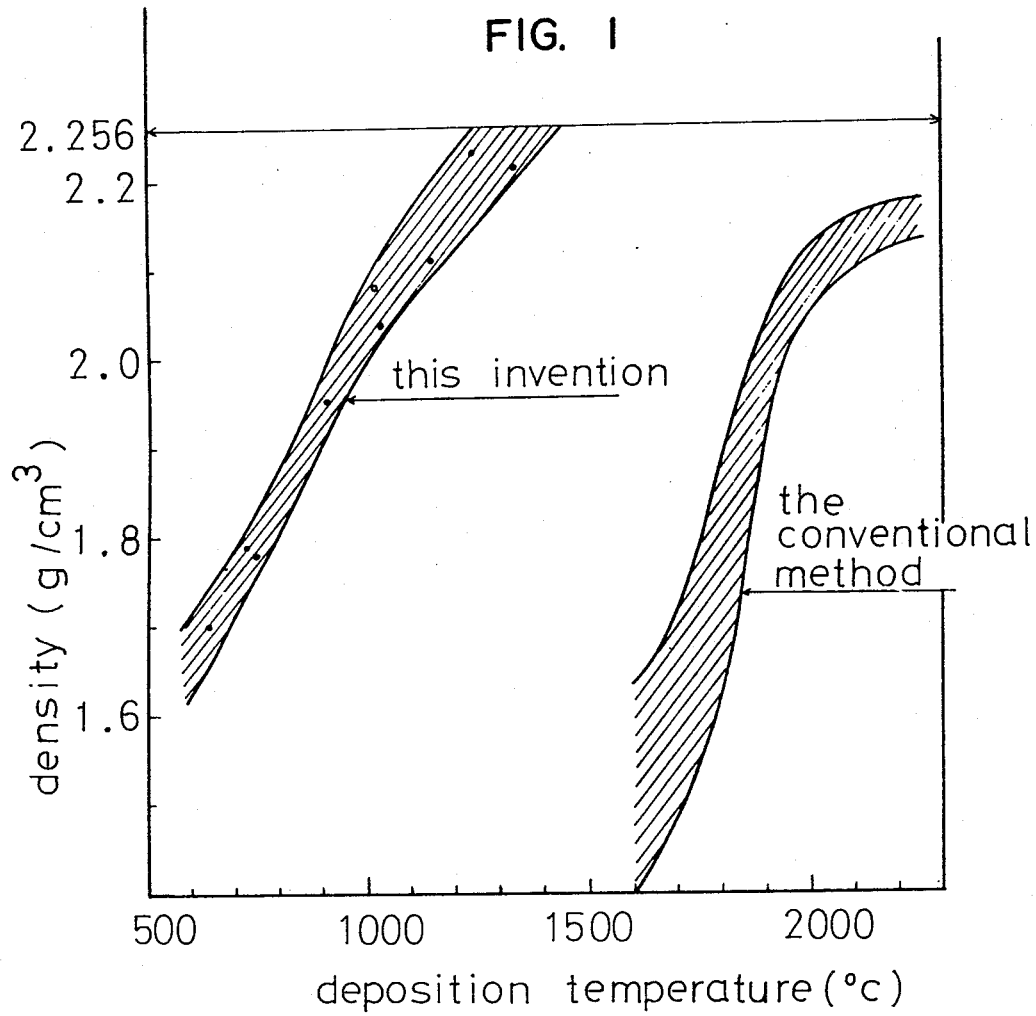

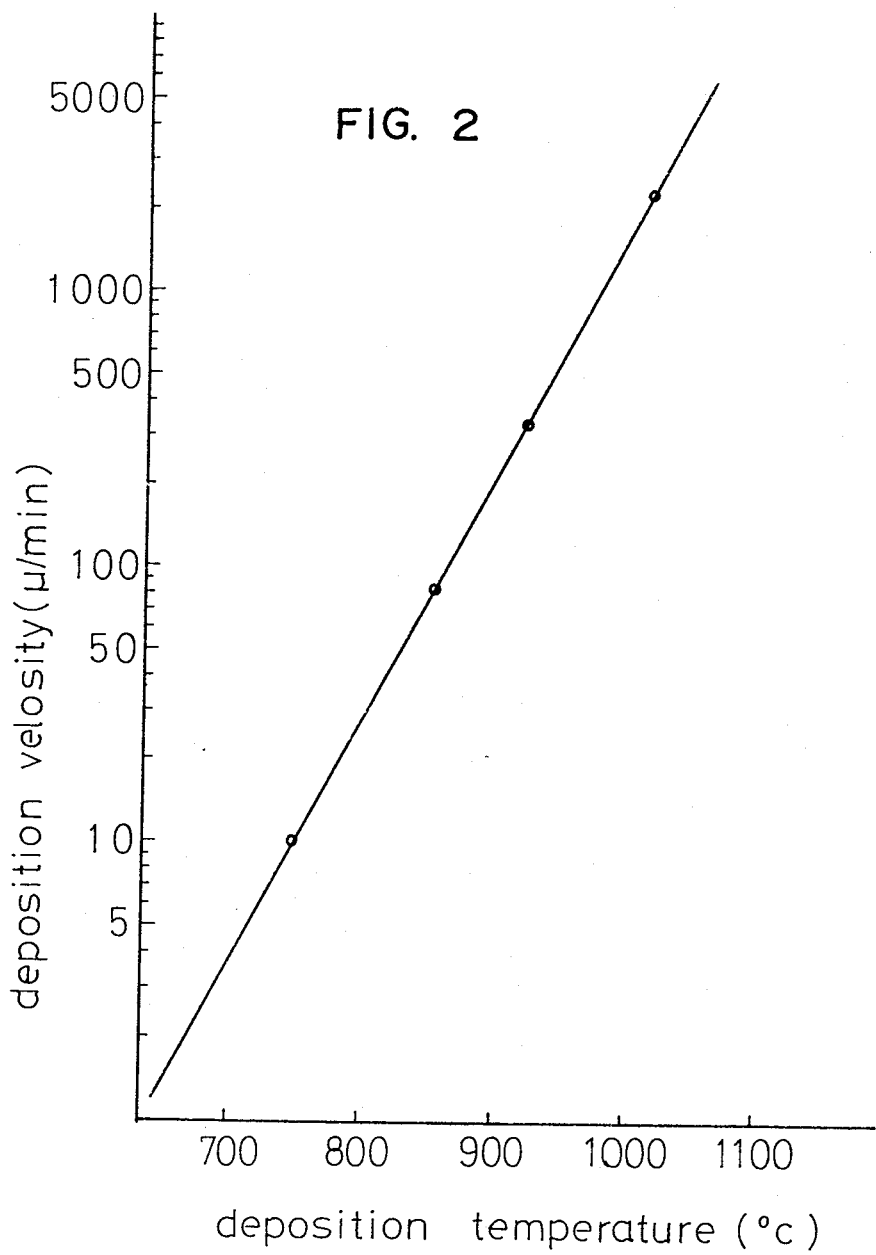

METHOD FOR PRODUCING ISOTROPIC PYROLISIS CARBON COATINGS

This is a continuation of application Ser. No. 101,621 filed Dec. 28, 1970 now abandoned.

DETAILED DESCRIPTION OF THE INVENTION

This invention relates to a process for the production of isotropic carbon and more particularly to a proces for the production of isotropic carbon by pyrolysis as well as isotropic pyrolytic carbon according to this process and shaped articles coated with the isotropic pyrolytic carbon.

The production of carbon, i.e. artificial graphite by pyrolysis has been carried out heretofore by effecting pyrolysis of a lower aliphatic hydrocarbon such as methane, ethane, propane, etc. on the surface of a substrate (parent body for deposition of carbon) heated at a high temperature of 1800°–2200°C. and depositing the resulting carbon on the substrate. However, carbon formed by such conventional process has an anisotropic crystal structure and is poor in some physical properties such as impact strength, coalescence and hardness. Thus, such carbon makes itself unsuited as construction material. In addition, satisfactory results cannot be obtained when a substrate having such carbon deposited thereon is used as a shaped body for use in complex shaped materials.

After making researches on pyrolytic carbon having an isotropic crystal structure suitable for use in construction materials and complex shaped materials and on the production of shaped materials having such carbon deposited thereon, we have found that when a compound having a vapor pressure of at least 5 mm Hg at 490°C. and at least two condensed rings is brought into contact with a substrate heated at a temperature of 600°–1500°C., said compound undergoes pyrolysis to form isotropic carbon which is deposited on the surface of the substrate. The isotropic pyrolytic carbon referred to herein is materially different from the known pyrolytic graphite and shows no orientation under observation with X-rays, while its crystals have an average interplanar space of 3.4 A, the value being nearer that of graphite than that of ordinary carbon. This invention has been accomplished on the basis of the above finding. Thus, it is a purpose of this invention to provide isotropic pyrolytic carbon. It is another purpose of this invention to provide various shaped materials coated with isotropic pyrolytic carbon by applying various shaped materials as substrate for deposition of such carbon.

Below is a detailed explanation on the construction and effect of this invention.

The organic compounds having condensed rings utilizable in this invention as starting material for the pyrolysis of carbon should have at least two condensed rings and have a vapor pressure of at least 5 mm Hg at 490°C. Such compounds can be used singly or in the form of mixture. Examples of such compounds include aromatic or cycloaliphatic hydrocarbons such as naphthalene, tetralin, decalin, indene, acenaphthene, fluorene, anthracene, phenanthrene, pyrene, naphthacene, chrycene, triphenylene, perilene, etc. and their alkyl derivatives. Additional compounds which are suitable are for example, nitrogen-containing compounds such as indole, quinoline, carbazole, phenanthrazine, etc.; oxygen-containing compounds such as anthraquinone, coumalone, naphthofurane, diphenylene oxide, etc.; sulfur-containing compounds such as thionaphthene, diphenylene sulfide, etc.; and alkyl derivatives of these compounds. The organic compounds having at least two condensed rings substituted by nitro groups, amino groups, hydroxy groups, nitrile groups, carboxy groups, etc. can also be used as starting materials of this invention. As starting materials in the form of a mixture, there can be mentioned fractions from crude oil having a boiling point of higher than 200°C.; residual oils formed as by-product in petroleum-refining industry such as vis breaker residual oil, coker residual oil, catalytically cracked recycle oil, asphalt fraction, dealkylated residual oil, etc.; residual oils obtained by various heat treatments in the field of petrochemistry such as bottom oils formed in the production of ethylene, tars formed in the production of ethylene-acetylene, oily tars formed in gasification, etc.; and so-called coaltar formed in dry distillation of coal. As described above, a wide variety of materials, especially in the form of a mixture can be used in this invention as starting material for the pyrolysis of carbon. Thus, this point is particularly advantageous from the industrial point of view.

These starting materials are then brought into contact with a substrate heated at a temperature of 600°–1500°C. A merit of this invention is found in the point that a relatively low temperature range of 600°–1500°C. is applicable. In the production of pyrolytic carbon, a temperature range of 1800°–2200°C. is conventionally applied as described above and a temperature lower than 1800°C. is considered to deteriorate the quality of the resulting carbon. Thus, it is quite surprising that the isotropic pyrolytic carbon of good quality is obtained according to this invention at a temperature above 600°C., preferably at a temperature of 750°–1500°C. The relation between the pyrolysis temperature (deposition temperature of the carbon on substrates) and the properties of the resulting carbon is shown in Table 1 below.

Table 1

| Deposition temperature (°C.) | 750 | 900 | 1,000 |
|---|---|---|---|
| Density (g./cm³) | 1.78 | 1.94 | 1.94–1.95 |
| Interplanar space $d_{002}$ (A) | 3.42 | 3.42 | 3.38 |
| Deposition velocity (μ/min.) | 8.70 | 270 | 1,000 |
| Oxidation initiation temperature (°c) | — | 520 | 700 |

As it is evident from Table 1, good results are obtained in this invention at a temperature much lower than that used in conventional processes. In addition, it will be understood from Table 1 that the deposition velocity of carbon formed by pyrolysis onto substrates is extremely high. As the deposition velocity in conventional processes is usually about 5 μ/min., the deposition velocity in this invention at a temperature of 900°C. or higher is several hundred times as high as that in the conventional processes. With respect to the density of the resulting carbon shown in said table, FIG. 1 of the attached drawings obviously shows that the product according to this invention is excellent. FIG. 2 shows the relation between the deposition velocity of the resulting carbon and the deposition temperature according to this invention.

The deposition rate of carbon on the substrate can be reduced to a desirable speed by diluting the starting material with inert gas.

In this invention, deposition of the carbon formed by pyrolysis may be carried out under ordinary atmospheric pressure. Suitably used as substrate for depositing the pyrolytic carbon thereon are shaped carbonaceous articles, glass, quartz, ceramics and shaped articles of various metals such as iron, iron alloys, nickel and nickel alloys. This invention has such a technical merit that substrates having a deterioration point lower than 1800°C. which is not being applicable to the conventional processes, such as shaped glass articles, can also be employed, since a temperature as low as 600°C. can be applied. Since substrates manufactured from a wide variety of materials can be used, this invention makes it possible to provide various shaped articles coated with the isotropic pyrolytic carbon by depositing carbon uniformly onto the substrates. In order to deposit onto the surface of these substrates the carbon formed from the starting material, i.e. an organic compound having at least two condensed rings, the vaporized starting material is brought alone or in dilution with an inert gas such as nitrogen or argon into contact with the substrates heated at 600°–1500°C. In case shaped glass articles are used as substrate, it will be necessary to apply indirect heating to the substrate at the initial stage of heating. However, heating by way of electroresistivity or electromagnetic wave may be applied after the resulting carbon begins to deposit on the substrates and electroconductivity is thus afforded. In case the starting material is liquid, the substrate may be dipped into the starting material and then subjected to pyrolysis operated at said temperature in a stream of an inert dilute gas. When it is desired to recover as single substance the resulting carbon which has been pyrolyzed and deposited on the substrate, the resulting carbon is rapidly cooled after deposition and then recovered. On the other hand, when it is desired to use the resulting carbon together with the substrate as shaped body for various industrial materials, the coated substrate can be used as such after completion of deposition. In the latter case, the substrate may be used in any desired form such as fiber, plate, rod, pillar, sheets, etc. Thus, the process of this invention may be interpreted as a novel process for the surface treatment of substrates.

As the pyrolytic carbon-coated shaped body obtained according to this invention has the carbon intimately deposited on the shaped body substrate, the so-called peeling phenomenon does not occur between the layers. Moreover, as the resulting carbon is an isotropic polycrystalline substance, the shaped body coated therewith is excellent in resistance to oxidation, weathering action and corrosion and has a high surface hardness. When glass is used in this invention as substrate, a shaped glass article having electroconductivity and excellent adhesiveness to the coated carbon which has not ever been observed in conventional products can be obtained. Thus, utility as industrial material for a variety of purposes is expected for such shaped glass articles. When a glass shaped article is used as substrate, it may be processed to a tubular, granular, spherical, foamy or fibrous shape in addition to the shapes previously mentioned. The surface of these glass shaped articles can previously be treated with a silane or borane as in the treatment of strengthened glass fibers. A shaped metal article to which a surface treatment such as plating has been applied can be used without trouble as substrate.

According to this invention, the starting material is brought in vapor phase contact with the substrate whereby carbon formed by pyrolysis is tightly deposited on the surface of the substrate and covers the surface. Thus, no pinhole is formed on the shaped article as substrate. From the foregoing, it will be understood that the shaped articles obtained according to this invention which are coated with the pyrolytic carbon are excellent in various physical properties as compared with the shaped articles obtained by the surface treatment according to conventional processes.

As described above, this invention permits advantageous production of isotropic pyrolytic carbon (artificial graphite) and provides various shaped articles coated with the carbon which possess excellent physical properties suitable for various industrial materials, in comparison with carbonaceous, metallic and glass shaped articles to which surface treatments have been applied according to conventional processes. Thus, this invention contributes largely to the fabrication techniques for industrial materials. Concerning the shaped articles obtained according to this invention, it should be noted that when a carbonaceous shaped article which is not susceptible of deterioration at high temperatures is used as substrate, the carbonaceous shaped article having pyrolytic carbon deposited thereon can be heated, if necessary, at a temperature of at least 2000°C. thereby converting the isotropic carbon deposited on the substrate into anisotropic carbon.

This invention will be explained more in detail by the following examples which are given only for the purpose of illustration and are not intended to limit the scope of this invention.

EXAMPLE 1

A tar fraction (containing at least 95 % of compound having three condensed rings) obtained by thermal cracking of petroleum, which had boiling points (calculated under normal pressure) of 300°–400°C. was vaporized by heating at 400°C. The vapor was brought into contact for 30 seconds with the outer surface of a quartz tube heated at 750°C. (surface temperature) which had a spiral electroresistant heating wire in the interior portion, whereby pyrolytic carbon having metallic luster was deposited on the surface. The pyrolytic carbon was an isotropic polycrystalline substance and had a density of 1.78 and an interplanar space ($d_{002}$) of 3.42 A.

EXAMPLE 2

Ethylene bottom oil (boiling point: 200°–300°C.; containing in average 65 % components having two condensed rings and 20 % components having three condensed rings) was dropped on a hot plate heated at 300° C. to vaporize the bottom oil. The vapor was brought into contact for 10 seconds with the surface of a quartz plate heated at 1000°C. whereby isotropic polycrystalline pyrolytic carbon having a density of 1.95 and an interplanar space ($d_{002}$) of 3.42 A was deposited on the surface.

EXAMPLE 3

Phenanthrazine

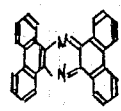

was heated at 490°C., diluted to 10% volume based on the starting material with nitrogen and then brought into contact for 10 seconds with the surface of a quartz plate heated at 1000°C. whereby isotropic polycrystalline pyrolytic carbon having a density of 1.98 and an interplanar space ($d_{002}$) of 3.42 A was deposited on the surface.

EXAMPLE 4

1,2-Naphthylenediamine was heated at 150°C. and brought into contact for 10 seconds with the surface of a quartz heated at 1000°C. whereby isotropic pyrolytic carbon having a density of 1.95 and an interplanar space ($d_{002}$) of 3.39 A was deposited on the surface.

EXAMPLE 5

1,4-Naphthoquinone was sublimated at 200°C. and brought into contact for 10 seconds with the surface of a quartz plate heated at 1000°C. whereby isotropic pyrolytic carbon having a density of 1.94 and an interplanar space ($d_{002}$) of 3.39 A was deposited on the surface.

EXAMPLE 6

Alpha,beta-naphthonitrile was vaporized by heating at 300°C. and brought into contact for 10 seconds with the surface of a quartz plate heated at 1000°C. whereby isotropic pyrolytic carbon having a density of 1.95 and an interplanar space ($d_{002}$) of 3.39 A was deposited on the surface.

EXAMPLE 7

1-Nitroanthraquinone was sublimated at 300°C. and brought into contact for 10 seconds with the surface of a quartz plate heated at 1000°C whereby isotropic pyrolytic carbon having a density of 1.96 and an interplanar space ($d_{002}$) of 3.40 A was obtained.

EXAMPLE 8

Thionaphthene was vaporized at 230°C. and brought into contact for 10 seconds with the surface of quartz heated at 1000°C. whereby isotropic pyrolytic carbon having a density of 1.96 and an interplanar space ($d_{002}$) of 3.40 A was obtained.

EXAMPLE 9

A tar fraction (boiling point: 200°–400°C.; containing about 40 % components having two condensed rings and about 25 % components having three condensed rings) obtained as by-product in the production of acetylene ethylene by high temperature pyrolysis of thermal cracking was heated at 350°C. and diluted with nitrogen in an amount sufficient to provide 20 % by volume of the mixture and then introduced into an apparatus for depositing pyrolytic carbon. On the other hand, a 1500 denier carbonaceous fiber yarn (baked product at 1000°C.) was introduced into the apparatus at a rate of 20 m/min. and heated at 1000°C. (surface temperature) by directly charging electric current to the yarn. Said gaseous mixture was continuously fed and brought into contact for one second with the yarn to form a carbonaceous fiber coated with isotropic pyrolytic carbon. Comparison in the loss in weight by oxidation and general physical properties of this yarn with the untreated yarn is shown in Table 2 below.

Table 2

| | Treated Yarn | Untreated Yarn |
|---|---|---|
| Tensile strength (monofilament)(t/cm$^2$) | 10 | 9 |
| Young's modulus ('')(t/cm$^2$) | 500 | 300 |
| Diameter ('') ($\mu$) | 9 | 9 |
| Loss in weight by oxidation with air, 600°C.-1 Hr. (wt.%) | 3 | 91 |
| Loss in weight by boiling with concentrated nitric acid (60%) for 3 hours (wt.%) | 3 | deformed to powder |
| Rate of absorption of water (25°C, RH 60%) (wt.%) | 0 | 10 |

As is evident from the above table, the carbonaceous fiber yarn of this invention coated with isotropic carbon is largely different in quality from the untreated yarn and is excellent in stability to oxidation and in mechanical strength.

EXAMPLE 10

A fabric made of carbonaceous fibers manufactured by backing at 1000°C. was heated at 1000°C. A gaseous mixture of phenanthrazine-nitrogen (20 % by volume) heated at 490°C. was used as starting material and brought into contact for 30 seconds with the heated fabric under normal pressure whereby isotropic pyrolytic carbon was coated on the fabric. Comparison in properties of the treated fabric with the untreated fabric is shown in Table 3 below.

Table 3

| | Treated fabric | Untreated fabric |
|---|---|---|
| Thickness (mm) | 0.5 | 0.5 |
| Weight (g./m$^2$) | 300 | 285 |
| Tensile strength (g./cm$^2$; longitudinal) | 500 | 320 |
| Tensile strength (g./cm$^2$; transverse) | 450 | 170 |
| Loss in weight by oxidation, 600°C.-2 Hrs. (air) | 4 | 80 |
| Rate of absorption of water (25°C., RH 60%) (wt.%) | 0 | 11 |

The above table obviously shows that the product of this invention is excellent in quality, as compared with the untreated fabric.

EXAMPLE 11

A carbon plate having a size of 10 cm × 7 cm × 0.3 cm (thickness) was heated to 1000°C. (surface temperature) by way of inductive heating method was exposed for 10 minutes in an atmosphere composed of a vapor of ethylene bottom oil (containing in average 65 % components having two condensed rings and 20 % components having three condensed rings) vaporized at 350°C. and nitrogen (20 % by volume) whereby the surface of the plate was coated with isotropic pyrolytic carbon. The results of measurement made on the coated plate and the original plate sample are shown in Table 4 below.

Table 4

|  | Treated plate | Untreated plate |
| --- | --- | --- |
| Bulk specific gravity | 1.70 | 1.60 |
| Flexural strength (kg./cm$^2$) | 250 | 200 |
| Young's modulus (kg./cm$^2$) | 1300 | 977 |
| Loss in weight by oxidation, 600°C.-2 Hrs. (air) (wt.%) | 2 | 70 |
| Rate of absorption of water (25°C., RH 60 %) (wt.%) | 0 | 5 |

The above table obviously shows superiority of the product of this invention in stability to oxidation and in mechanical properties. A difference in the bulk specific gravity shows that pores formed in the shaping treatment of the plate were filled with the pyrolytic carbon, resulting in improvement in mechanical properties

EXAMPLE 12

A tar fraction containing 85 % of aromatic compounds having two condensed rings (b.p. 195°–250°C.) formed by thermal cracking of petroleum was heated at 300°C., diluted to 0.6 vol. % with nitrogen maintained at the same temperature and then brought at a flow rate of 5 liters per minute into contact for 15 minutes with a mild steel plate heated at 1000°C. whereby the mild steel plate coated with an isotropic pyrolytic carbon layer having a thickness of 10 $\mu$ was obtained. This mild steel plate was subjected to corrosion-resistance tests shown in Table 5, the results being shown also in Table 5.

Table 5

Results of corrosion-resistance tests
Corrison-resistance test

| Corrosive Environment | Temperature | Time | Coated g./cm$^2$ | Untreated g./cm$^2$ |
| --- | --- | --- | --- | --- |
| Sea-water | 70°C. | 10 days | 0.0001 | 0.1 |
| Hydrochloric acid (30%) | 20°C. | 5 hours | 0.0000 | 0.04 |
| Sulfuric acid (30%) | " | " | 0.0000 | 0.005 |
| Nitric acid (1-N) | " | " | 0.0001 | 0.11 |
| Caustic soda (10%) | " | " | 0.0000 | 0.0009 |

Remarks:
The values stand for the reduced quantity after dipping the sample into the corrosive bath for a given period of time.

The above table obviously shows effect of the coated plate.

EXAMPLE 13

Phenanthrazine was heated at 490°C., diluted to 0.6 vol. % with a mixed gas of hydrogen/nitrogen (1:1) maintained at the same temperature and then brought under ambient pressure into contact for 15 minutes with a stainless steel tube (C 0.3 %, Cr 12.2%) heated at 800°C having an inside diameter of 10 mm whereby a stainless steel tube coated with an isotropic pyrolytic carbon layer having a thickness of 5 $\mu$ was obtained. A sea-water and chemicals resistance tests of the coated stainless steel tube showed excellent results as shown in Table 5. The consumed quantities of the tube in the above tests were respectively 0.0001–0.0002 g./cm$^2$ even at a high temperature (5 hours at 100°C.), thus demonstrating excellent corrosion-resistance property of the treated product.

EXAMPLE 14

Ethylene bottom oil (fraction having a boiling point of 195°–350°C. and containing aromatic compounds composed in average of about 40 % components having two condensed rings and about 40 % components having three condensed rings) was heated at 300°C., diluted to 2 vol. % with nitrogen maintained at the same temperature and then brought into contact for 5 minutes with a chromium electroplated copper plate heated at 750°C. whereby a mirror-like metallic plate coated with an isotropic pyrolytic carbon layer having a thickness of 5 $\mu$ was obtained. No change was observed in the mirror face when the coated plate was treated with 30 % hydrochloric acid at 80°C. for 5 hours.

EXAMPLE 15

A fraction (containing 4.5 % of aromatic components having two condensed rings and 45 % of aromatic components having three condensed rings) boiling at 200°–300°C. of coal tar was heated at 300°C., diluted to 5 vol. % with nitrogen maintained at the same temperature and then brought into contact for 15 seconds with a nickel plate heated at 800°C. whereby a nickel plate coated with isotropic pyrolytic carbon was obtained. When this metal plate was treated with 30 % nitric acid at 80°C. for 3 hours, loss in weight was found to be very slight.

EXAMPLE 16

A tar fraction (boiling point: 195°–250°C.; containing at least 80 % of naphthalene derivatives such as naphthalene itself, methylnaphthalene and dimethylnaphthalene, etc.) formed by thermal cracking of petroleum was heated at 300°C., diluted to 0.6 vol. % with nitrogen at the same temperature and then brought at a flow rate of 5 liters per minutes into contact with alkali glass fibers heated at 600°C. The fibers were heated at a rate of 1°C./min. to 850°C. and then gradually cooled in nitrogen atomosphere to room temperature whereupon corrosion-resistant, electro-conductive glass fibers having metallic luster and 5 wt. % of isotropic carbon coated thereon were obtained.

In a comparative test where the glass fibers were heated to 850°C. in pure nitrogen atmosphere free from said tar fraction under the abovementioned conditions, the glass fibers were fused to one another The above results are shown in Table 6 below.

Table 6

|  |  | I | II |
|---|---|---|---|
| Corrosion-resisting properties | 10 % NaOH solution (boiling, 12 hours) loss in weight(%) | 0.1 | gelled |
|  | 5 % Hydrofluoric acid (room temperature, 1 hour) loss in weight (%) | 0.03 | Violently reacted and disappeared |
|  | 60 % $HNO_3$ solution (boiling, 1 hour) loss in weight (%) | 0.2 | 0.2 |
|  | Air, 500°C. (heating, 1 hour) loss in weight (%) | 0.5 | — |
| Mechanical and electrical properties | Diameter of fiber ($\mu$) | 10 | — |
|  | Tensile strength ($t/cm^2$) | 8 | fused mutually |
|  | Elongation (%) | 1.9 | — |
|  | Electric resistance (k$\Omega$/m) | 1.5 | $\infty$ |

I: Glass fibers coated with the isotropic pyrolytic carbon
II: Ordinary glass fibers merely heated to 850°C. in pure nitrogen atomosphere

EXAMPLE 17

A yarn (outer diameter: 4 mm; length: 240 mm; weight: 1.4g.) made of quartz fibers was heated at 1000°C. A gaseous mixture of phenanthrazine-nitrogen (10 vol. %) heated at 490°C. was used as starting material and brought into contact for 30 seconds with the yarn under normal pressure whereby isotropic pyrolytic carbon was coated on the yarn. The coated amount of the isotropic carbon was 10 wt. %.

The results are shwn in Table 7 below.

Table 7

|  |  | I | II |
|---|---|---|---|
| Corrosion-resisting properties and electrical property | 10 % NaOH solution (boiling, 12 hours) loss in weight (%) | 0.05 | gelled |
|  | 5 % Hydrofluoric acid (room temperature, 1 hour) loss in weight (%) | 0.00 | violently reacted and disappeared |
|  | 60 %$HNO_3$ solution (boiling, 1 hour) loss in weight (%) | 0.1 | — |
|  | Air, 500°C. (heating, 1 hour) loss in weight (%) | 0.2 | — |
|  | Electric resistance (k$\Omega$/m) | 0.1 | $\infty$ |

I: Quartz yarn coated with the isotropic pyrolytic carbon
II: Quartz yarn merely heated to 1000°C. in nitrogen

EXAMPLE 18

A fraction of crude oil containing in average 75 % of aromatic compounds having 2–3 condensed rings were heated at 200°–400°C., diluted to 20 vol. % with nitrogen heated at the same temperature and brought into contact for 30 seconds with an interior wall of a quartz pipe (having a length of 1 m and an inside diameter of 20 mm) heated at 1200°C. whereby the interior wall of the quartz pipe was coated with a mirror-like, dense and uniform isotropic pyrolytic carbon layer having a thickness of about 2 $\mu$. The electric resistance of the resulting pipe was 180 k$\Omega$/m. No change was observed in the mirror face when treated with 10 % NaOH solution or 5 % hydrofluoric acid solution.

EXAMPLE 19

Ethylene bottom oil (a fraction having boiling points of 195°–350°C. and containing in average about 40 % components having 2 condensed rings and about 40 % components having 3 condensed rings) was heated at 300°C., diluted to 2 vol. % with a mixed gas of nitrogen-hydrogen (1:1) and then brought into contact for 10 minutes with an alkali-free glass ball (having a diameter of 100 $\mu$) heated at 750°C. whereby the glass ball coated with an isotropic pyrolytic carbon layer having a thickness of 2 $\mu$ was obtained.

What is claimed is:

1. A process for the production of an article coated with isotropic pyrolytic carbon, which comprises vaporizing a material having a vapor pressure of at least 5 mm Hg at 490°C and at least two condensed rings; and bringing said thus vaporized material into contact with the article heated to a temperature of 600°–1500°C, thereby depositing said carbon as a coating on the article.

2. The process according to claim 1, wherein said material vaporized by heating is diluted with an inert gas prior to being brought into contact with the article.

3. A process according to claim 1 wherin the article is a carbonaceous shaped article.

4. A process according to claim 1 wherein the article is a metallic shaped article.

5. A process according to claim 1 wherein the article is a glass shaped article.

6. The process of claim 1, wherein the material is a residual oil obtained by cracking petroleum.

* * * * *

UNITED STATES PATENT OFFICE
CERTIFICATE OF CORRECTION

Patent No. 3,949,106   Dated April 6, 1976

Inventor(s) Tadashi Araki, et al

It is certified that error appears in the above-identified patent and that said Letters Patent are hereby corrected as shown below:

On the cover sheet item [73] should read;

-- Assignees: of one-half to Kureha Kagaku Kogyo Kabushiki Kaisha, Tokyo, Japan and one-half to Toyo Boseki Kabushiki Kaisha, Osaka, Japan --.

[30] Foreign Applications Priority Data
| March 27, 1970 | Japan | SHO 45-25263 |
| Dec. 29, 1969 | Japan | SHO 44-105231 |
| Dec. 29, 1969 | Japan | SHO 44-105230 |
| March 27, 1970 | Japan | SHO 45-25262 |

Signed and Sealed this

Twenty-fourth Day of August 1976

[SEAL]

Attest:

RUTH C. MASON
Attesting Officer

C. MARSHALL DANN
Commissioner of Patents and Trademarks